United States Patent
Berndt et al.

(10) Patent No.: US 9,625,304 B2
(45) Date of Patent: Apr. 18, 2017

(54) SYSTEMS AND METHODS TO INITIATE A VERIFICATION TEST WITHIN A FLOW METER VIA A FLOW COMPUTER

(71) Applicant: Bristol, Inc., Watertown, CT (US)

(72) Inventors: Justin Mickael Berndt, Marshalltown, IA (US); Mary Barbara Abens, Marshalltown, IA (US)

(73) Assignee: BRISTOL, INC., Houston, TX (US)

( * ) Notice: Subject to any disclaimer, the term of this patent is extended or adjusted under 35 U.S.C. 154(b) by 1031 days.

(21) Appl. No.: 13/868,357

(22) Filed: Apr. 23, 2013

(65) Prior Publication Data
US 2013/0304411 A1    Nov. 14, 2013

Related U.S. Application Data

(60) Provisional application No. 61/645,865, filed on May 11, 2012.

(51) Int. Cl.
*G01F 25/00* (2006.01)

(52) U.S. Cl.
CPC ................. *G01F 25/0007* (2013.01)

(58) Field of Classification Search
CPC combination set(s) only.
See application file for complete search history.

(56) References Cited

U.S. PATENT DOCUMENTS 6,978,210 B1 * 12/2005 Suter et al. .......... 702/13
7,865,318 B2    1/2011 Rensing et al.
8,027,793 B2 *  9/2011 Ellender et al. ........ 702/45
2002/0007854 A1  1/2002 Dilger et al.
2006/0287839 A1 12/2006 Dutton

FOREIGN PATENT DOCUMENTS

WO    2008011298 A2    1/2008

OTHER PUBLICATIONS

International Searching Authority, "Search Report", issued in connection with PCT patent application No. PC/US2013/040726, issued on Sep. 16, 2013, 2 pages.
International Bureau, "International Preliminary Report on Patentability", issued in connection with PCT patent application No. PCT/US2013/040726, mailed on Nov. 20, 2014, 8 pages.
International Searching Authority, "Written Opinion", issued in connection with PCT patent application No. PC/US2013/040726, issued on Sep. 16, 2013, 6 pages.
Micro-Motion, "Smart Meter Verification," Apr. 2013, (4 pages).

* cited by examiner

*Primary Examiner* — Huan Tran
(74) *Attorney, Agent, or Firm* — Hanley, Flight & Zimmerman, LLC

(57) ABSTRACT

Systems and methods to initiate a verification test within a flow meter via a flow computer are disclosed. An example method includes communicating, via a flow computer, a request to a flow meter to initiate a verification test of the flow meter. The example method also includes retrieving diagnostic data from the flow meter. The example method further includes logging a result of the verification test in a log of the flow computer, the result based on the diagnostic data.

21 Claims, 6 Drawing Sheets

SYSTEMS AND METHODS TO INITIATE A VERIFICATION TEST WITHIN A FLOW METER VIA A FLOW COMPUTER

RELATED APPLICATION

This patent claims the benefit of U.S. Provisional Patent Application Ser. No. 61/645,865, entitled "Systems and Methods to Initiate a Verification Test within a Flow Meter via a Flow Computer," which was filed on May 11, 2012, and which is incorporated herein by reference in its entirety.

FIELD OF THE DISCLOSURE

This disclosure relates generally to supervisory and data acquisition control systems and, more particularly, to systems and methods to initiate a verification test within a flow meter via a flow computer.

BACKGROUND

Supervisory control and data acquisition (SCADA) systems, like those used in the oil and gas production industry, frequently include flow computers as central pieces of equipment in a production process system (e.g., at a wellhead production site). Flow computers are used to perform flow calculations, control the system, optimize the system, create historical archives, and/or communicate with the SCADA network. Monitoring and/or controlling a process system via a flow computer is accomplished by interfacing the flow computer with field devices (e.g., valves, valve positioners, switches, sensors, transmitters, etc.) configured to perform control functions such as opening or closing valves and measuring process parameters. Such field devices interface with the flow computer via any of analog, digital, or combined analog/digital buses via any desired communication media (e.g., hardwired, wireless, etc.) and protocols (e.g., Fieldbus, Profibus®, HART®, Modbus®, etc.).

SUMMARY

Systems and methods to initiate a verification test within a flow meter via a flow computer are disclosed. An example method is disclosed that includes communicating, via a flow computer, a request to a flow meter to initiate a verification test of the flow meter. The example method also includes retrieving diagnostic data from the flow meter. The example method further includes logging a result of the verification test in a log of the flow computer, the result based on the diagnostic data.

An example flow computer constructed in accordance with the teachings disclosed herein includes a flow meter interface to communicatively couple the flow computer to a flow meter. The flow meter interface is to communicate a request to the flow meter to initiate a verification test of the flow meter and to retrieve diagnostic data from the flow meter. The example flow computer also includes a memory to log a result of the verification test, the result based on the diagnostic data.

An example tangible machine readable storage medium is disclosed that includes instructions, which when executed, cause a machine to at least communicate a request to a flow meter initiate a verification test of a flow meter, retrieve diagnostic data from the flow meter, and log a result of the verification test in a log of the flow computer. The result is based on the diagnostic data.

DETAILED DESCRIPTION

Figure 1:
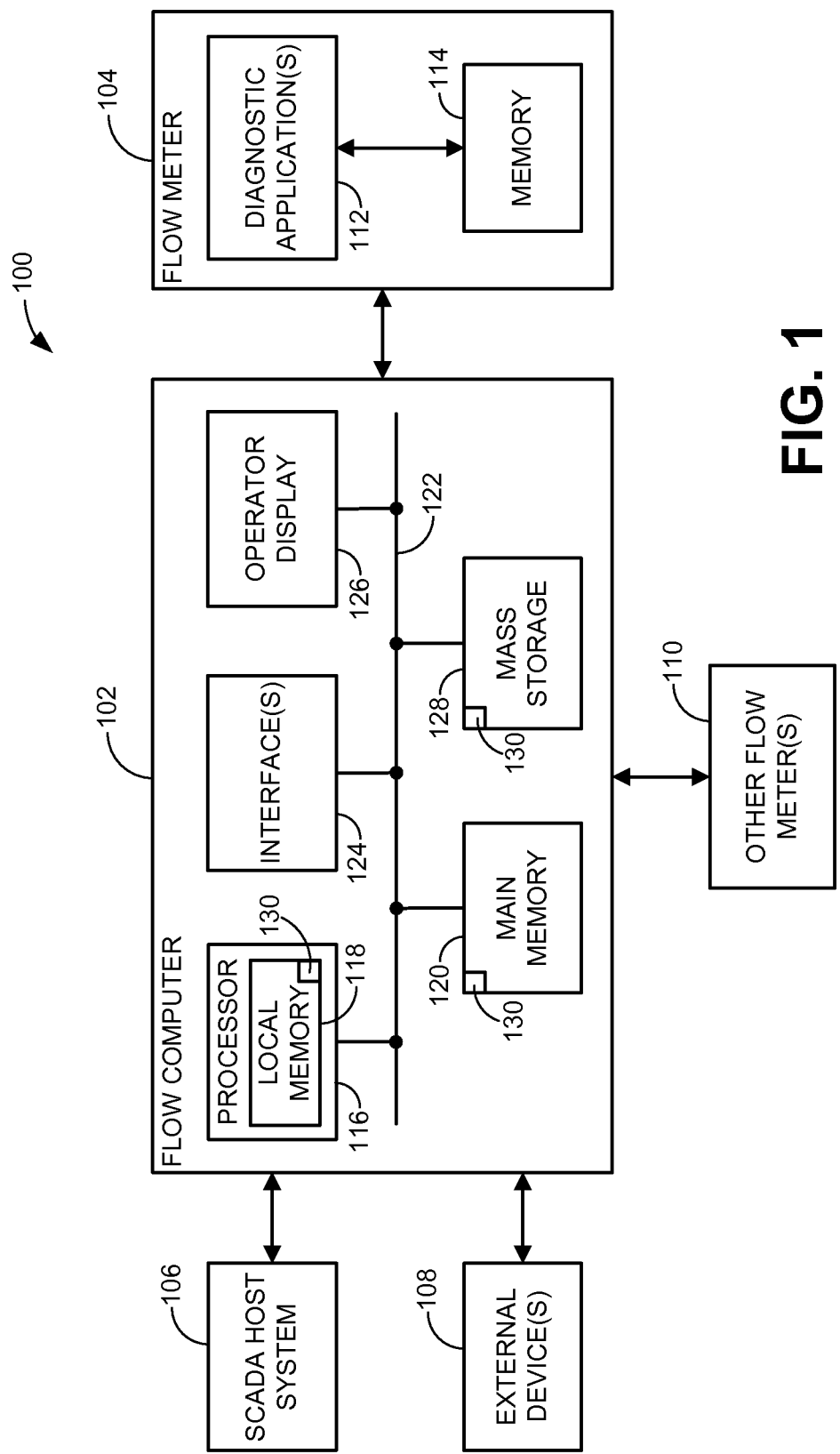
FIG. 1 illustrates an example system comprising an example flow computer implemented in accordance with the teachings disclosed herein.

FIG. 1 illustrates an example system 100 comprising an example flow computer 102 implemented in accordance with the teachings disclosed herein. In the illustrated example, the flow computer 102 is in communication with a flow meter 104. In some examples, the flow computer 102 may also be in communication with at least one of a supervisory control and data acquisition (SCADA) host system 106, one or more external device(s) 108 (e.g., other components in a SCADA system, a laptop, a handheld field communicator, etc.), or one or more other flow meter(s) 110.

The flow meter 104 illustrated in FIG. 1 may be any suitable flow meter that contains internal functionality to run diagnostics to verify the performance and integrity of the flow meter 104. For example, the flow meter 104 may be a flow meter that uses the Coriolis Effect with the Smart Meter Verification diagnostic tool developed by Micro Motion, a division of Emerson Process Management. Accordingly, in the example system 100, the flow meter 104 includes one or more diagnostic application(s) 112 to perform tests and/or diagnostics on the flow meter 104. In the illustrated example, the flow meter 104 includes a diagnostic application 112 to run a verification test on the componentry of the flow meter 104. The diagnostic application 112 produces diagnostic data associated with the verification test that may be stored in an internal memory 114. In some known flow meters 104, the internal memory 114 where the diagnostic data is stored comprises registers. The diagnostic data may include an indication of the operational state of the test (e.g., whether the test is running or not running), the progress and/or completion of the verification test (e.g., initializing, measuring, analyzing, complete, and/or percent complete), the value of secondary parameters measured and/or calculated during the verification test, the result of the verification test (e.g., the success or failure of the flow meter 104 in passing the verification test), and/or any errors associated with a failed verification test. The success or failure of the flow meter 104 may be determined based on whether the measured secondary parameters are within boundary limits defined in the factory specifications.

For example, a typical flow meter may be used to measure the mass flow rate of fluid in a pipe. The flow meter may be connected in line with the pipe and include one or more tubes or conduits defining inlet and outlet apertures through which the fluid in the pipe may flow. The flow meter may determine flow rate by vibrationally exciting the tube(s)

while material is flowing through the pipe. The inertial forces from the flowing material in the pipe may combine with the vibrating tube(s) to cause the Coriolis Effect, whereby there is a phase shift in the vibration of the tube(s) at different points along the tube(s), such as at points adjacent the inlet and outlet apertures. Using such a flow meter and the Coriolis Effect, the mass flow rate of the fluid in the pipe is proportional to the time delay or phase difference at the separate points along the tube(s). As such, the mass flow rate can be determined by multiplying the time delay by a calibration constant based on the material properties and shape of the tube(s), which can be related to a stiffness parameter of the tube(s) of the flow meter. Thus, in such examples, the secondary parameters include the phase difference of the vibrations of the tubes at the separate points and the stiffness calculated from the phase difference. From such secondary parameters, the integrity and performance of a flow meter that uses the Coriolis Effect may be determined by enabling the flow meter to implement a verification test that excites the tube(s) via a controlled vibration while material is flowing through a corresponding pipe, measures the vibrational response of the tube(s) at multiple points, determines a stiffness parameter at each of the points along the tube(s) based on the measured phase shift at each point, and compares the stiffness parameters to preconfigured limits for the flow meter specified at the time of manufacture. A stiffness parameter falling outside factory specifications is an indication that the flow meter is incapable of accurately measuring the flow rate of material in the pipe.

After the flow meter 104 has undergone a verification test, the resulting diagnostic data may be accessed by an operator to initiate any appropriate response based on the results (e.g., replace the flow meter 104 if the flow meter failed the verification test). However, the data from many known flow meters implementing such diagnostic tools is typically only accessible via proprietary applications developed in connection with the flow meters. As a result, the diagnostic results of the flow meter cannot be directly included into an overall process system, such as a SCADA system, to enable operators to acquire a more complete picture of the system, to remotely interact with the flow meter over a system host application, to remotely schedule and/or initiate a verification test via the system host application, to timestamp and archive when the verification test is run (e.g., when initiated and/or aborted) in an event log of an audit trail associated with the SCADA system for subsequent analysis, review, and/or training in connection with other events and/or alarms in the system.

Such obstacles are overcome by the example flow computer 102 illustrated in FIG. 1 that interfaces with the flow meter 104 in accordance with the teachings disclosed herein. The example flow computer 102 of the illustrated example includes an example processor 116. The processor 116 of the illustrated example is hardware. For example, the processor 116 can be implemented by one or more integrated circuits, logic circuits, microprocessors or controllers from any desired family or manufacturer.

The processor 116 of the illustrated example includes a local memory 118 (e.g., a cache). The processor 116 of the illustrated example is in communication with a main memory 120, including volatile memory and non-volatile memory, via a bus 122. The volatile memory of the main memory 120 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory of the main memory 120 may be implemented by flash memory and/or any other desired type of memory device. Access to the main memory 120 is controlled by a memory controller.

The flow computer 102 of the illustrated example also includes one or more interface(s) 124. The interface(s) 124 may be implemented by any type of interface standard, such as an Ethernet interface, a universal serial bus (USB), a PCI express interface, a serial peripheral interface (SPI) bus, and/or interfaces employed in SCADA and other process control systems (e.g., Fieldbus, Profibus®, HART®, Modbus®, etc.) to communicate with internal and/or external components(s) to enable operators to enter input data, commands, and/or other information into the flow computer 102 and/or to receive data and/or other information from the flow computer 102. The internal component(s) in the illustrated example include components integral to the flow computer 102 such as, for example, an operator display (e.g., the operator display 126) that may include a display screen, a keyboard, buttons, indicator lights, etc. The external component(s) in the illustrated example include, for example, the SCADA host system 106 and/or other external device(s) 108 such as, for example, a laptop, a handheld field communicator, a printer, etc. Additionally, the example flow computer 102 may interface with field devices and/or other components in the SCADA system 100, such as the flow meter 104 and/or other flow meters 110.

More particularly, the internal and/or external component(s) can be implemented to input data by, for example, an audio sensor, a microphone, a camera (still or video), a keyboard, a button, a mouse, a touchscreen, a track-pad, a trackball, isopoint and/or a voice recognition system. Further, the internal and/or external component(s) can be implemented to output data by, for example, display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface(s) 124 in some examples may include a graphics driver card, a graphics driver chip or a graphics driver processor.

The interface(s) 124 of the illustrated example also include a communication device such as a transmitter, a receiver, a transceiver, a modem and/or network interface card to facilitate exchange of data with the external component(s) (e.g., computing devices of any kind) via a network (e.g., an Ethernet connection, a RS-485 connection, a digital subscriber line (DSL), a telephone line, coaxial cable, a cellular telephone system, etc.) using any desired communication media (e.g., wireless, hardwired, etc.) and protocols (e.g., HTTP, SOAP, etc.).

The flow computer 102 of the illustrated example also includes one or more mass storage devices 128 for storing software and data. Examples of such mass storage devices 128 include flash drives or memory chips, floppy disk drives, hard drive disks, compact disk drives, Blu-ray disk drives, RAID systems, and digital versatile disk (DVD) drives. Among other things, the mass storage devices 128 of the example flow computer 102 may store coded instructions 130 implemented to perform all or any part of the functionality of the flow computer 102. Additionally or alternatively, the coded instructions 130 may be stored in the local memory 118, in the volatile or nonvolatile memory of the main memory 120, and/or on a removable tangible computer readable storage medium such as a CD or DVD. The coded instructions 130 of the illustrated example include instructions to implement the example processes of FIGS. 2, 3A-B, and 4A-B described below to interface with the flow meter 104 and/or the SCADA host system 106, or the external device(s) 108 to initiate a flow meter verification test and to archive the timing and results of the same in an event log and/or and alarm log associated with the SCADA system.

While an example manner of implementing the flow computer 102 is illustrated in FIG. 1, one or more of the elements, processes and/or devices illustrated in FIG. 1 may be combined, divided, re-arranged, omitted, eliminated and/or implemented in any other way. Further, the example processor 116, the example main memory 120, the example interface(s) 124, the example mass storage 128 and/or, more generally, the example flow computer 102 of FIG. 1 may be implemented by hardware, software, firmware and/or any combination of hardware, software and/or firmware. Thus, for example, any of the example processor 116, the example main memory 120, the example interface(s) 124, the example mass storage 128 and/or, more generally, the example flow computer 102 could be implemented by one or more circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 116, the example main memory 120, the example interface(s) 124, and/or the example mass storage 128 is/are hereby expressly defined to include a tangible computer readable storage device or storage disk such as a memory, a digital versatile disk (DVD), a compact disk (CD), a Blu-ray disk, etc. storing the software and/or firmware. Further still, the example flow computer 102 of FIG. 1 may include one or more elements, processes and/or devices in addition to, or instead of, those illustrated in FIG. 1, and/or may include more than one of any or all of the illustrated elements, processes and devices.

Flowcharts representative of example processes for implementing the flow computer 102, and/or, more generally, the example system 100 of FIG. 1 are shown in FIGS. 2, 3A-B, and 4A-B. In these examples, the processes may be implemented as a program for execution by a processor such as the processor 116 shown in the example flow computer 102 discussed above in connection with FIG. 1. The program may be embodied in software stored on a tangible computer readable storage medium such as a CD-ROM, a floppy disk, a hard drive, a digital versatile disk (DVD), a Blu-ray disk, or a memory associated with the processor 116, but the entire program and/or parts thereof could alternatively be executed by a device other than the processor 116 and/or be embodied in firmware or dedicated hardware. Further, although the example program is described with reference to the flowchart illustrated in FIGS. 2, 3A-B, and 4A-B, many other methods of implementing the example flow computer 102, and/or, more generally, the example system 100 may alternatively be used. For example, the order of execution of the blocks may be changed, and/or some of the blocks described may be changed, eliminated, or combined.

As mentioned above, the example processes of FIGS. 2, 3A-B, and 4A-B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 2, 3A-B, and 4A-B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage media in which information is stored for any duration (e.g., for extended time periods, permanently, for brief instances, for temporarily buffering, and/or for caching of the information). As used herein, the term non-transitory computer readable device or disk is expressly defined to include any type of computer readable medium and to exclude propagating signals. As used herein, when the phrase "at least" is used as the transition term in a preamble of a claim, it is open-ended in the same manner as the term "comprising" is open ended.

Figure 2:
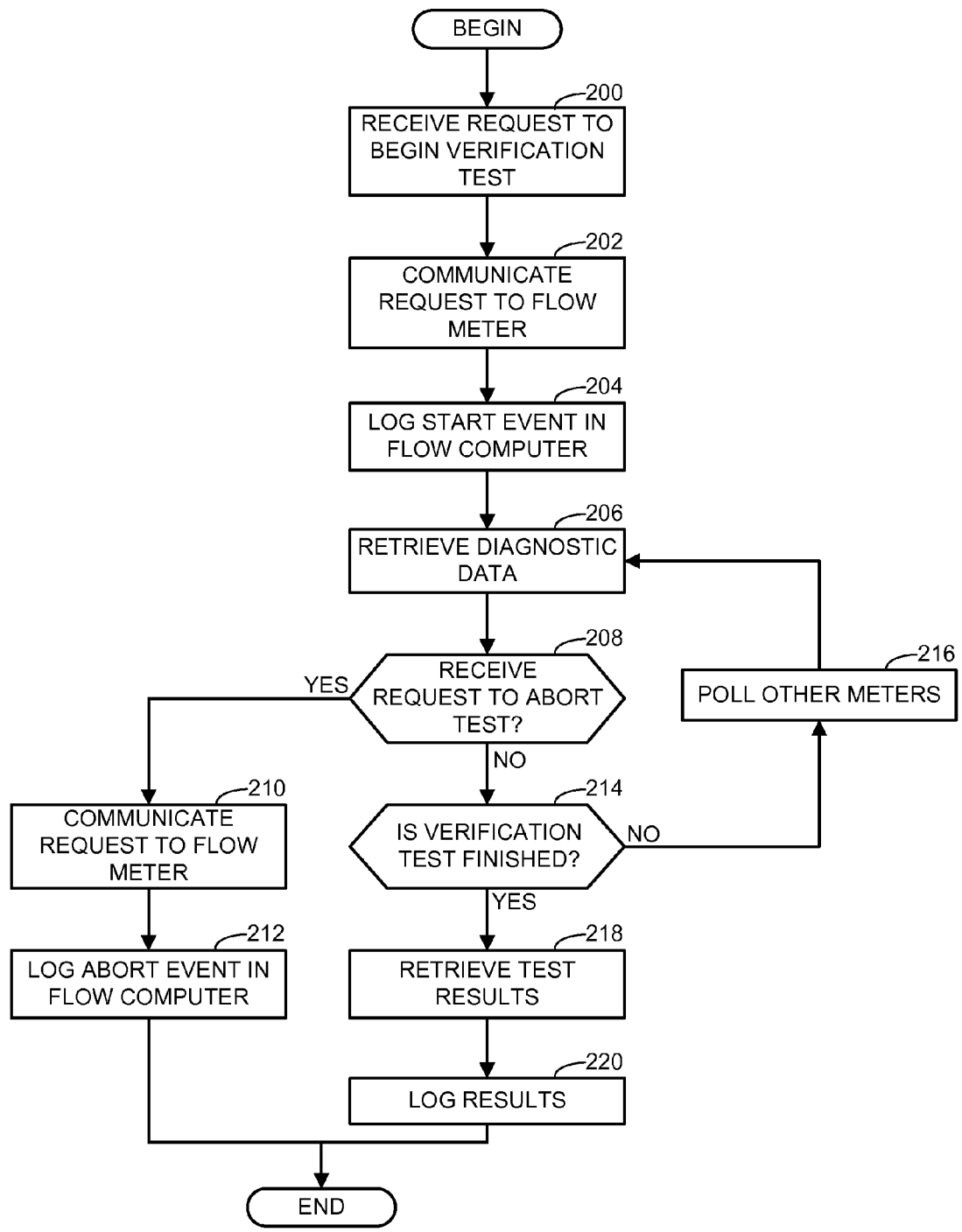
FIG. 2 is a flowchart representative of an example process that may be carried out to implement the example flow computer and/or, more generally, the example system of FIG. 1.

The example process of FIG. 2 begins at block 200 by receiving (e.g., via the flow computer 102) a request to initiate a verification test in a flow meter (e.g., the example flow meter 104). The example process includes communicating the request to the flow meter (e.g., 104) (block 202). For example, the flow computer (e.g., 102) may write a start code and send it to the flow meter (e.g., 104) via the interface (e.g., 124) of the flow computer (e.g., 102). The example process also logs a start event (block 204) (e.g., within an audit trail or other archive in the mass storage 128 of the flow computer 102).

The example process of FIG. 2 also includes retrieving diagnostic data (block 206). The diagnostic data may, for example, be retrieved from a flow meter (e.g., the example flow meter 104) containing a diagnostic application (e.g., 112) to run a verification test. The diagnostic data may include any relevant information such as the operational state of the verification test (e.g., running/not running), the progress and/or completion of the verification test (e.g., initializing, measuring, analyzing, complete, and/or percent complete), the value of secondary parameters measured and/or calculated during the verification test, the results of the verification test (e.g., success or failure of the flow meter (e.g., 104) in passing the verification test), any errors associated with a failure of the flow meter 104 and/or any other information relevant to the verification test as described above. Further, in retrieving the diagnostic data, the diagnostic data is also stored in the memory of the flow meter (e.g., the memory 114 of the flow meter 104). In some examples, the diagnostic data may be stored in registers associated with the flow meter (e.g., 104) that the flow computer (e.g., 102) has access to by communicating with the flow meter (e.g., 104) via a corresponding interface (e.g., 124). The example process further determines whether a request to abort the verification test has been received (block 208). If a request to abort the verification test is received, the request is communicated to the flow meter (e.g., 104) (block 210). The request may be communicated by the flow computer (e.g., 102) writing an abort code to be sent to the flow meter (e.g., 104) via the interface (e.g., 124). Additionally, the example process of FIG. 2 includes logging an abort event (block 212).

If no request to abort the verification test is received, the example process continues to block 214 where the example process determines whether the verification test is finished or complete. If it is determined that the verification test is not finished, the example process polls other meters (block 216) before returning to block 206 to retrieve updated diagnostic data. In some examples, if the verification is not finished, the flow computer will poll the other meters and then wait to cycle back to block 206 on a scheduled basis (e.g., every second, every 4 seconds, etc.). Once it is determined that the verification test is complete (at block 214) the example process retrieves results of the verification test (block 218). Whether the results indicate the flow meter (e.g., 104) passed or failed the verification test, the example process archives the results in an event log and/or an alarm log associated with an audit trail or other archive (block 220). Once the results have been logged (at block 220) or the verification test aborted with a corresponding log entry (blocks 210 and 212) the example process of FIG. 2 ends.

Figure 3A:
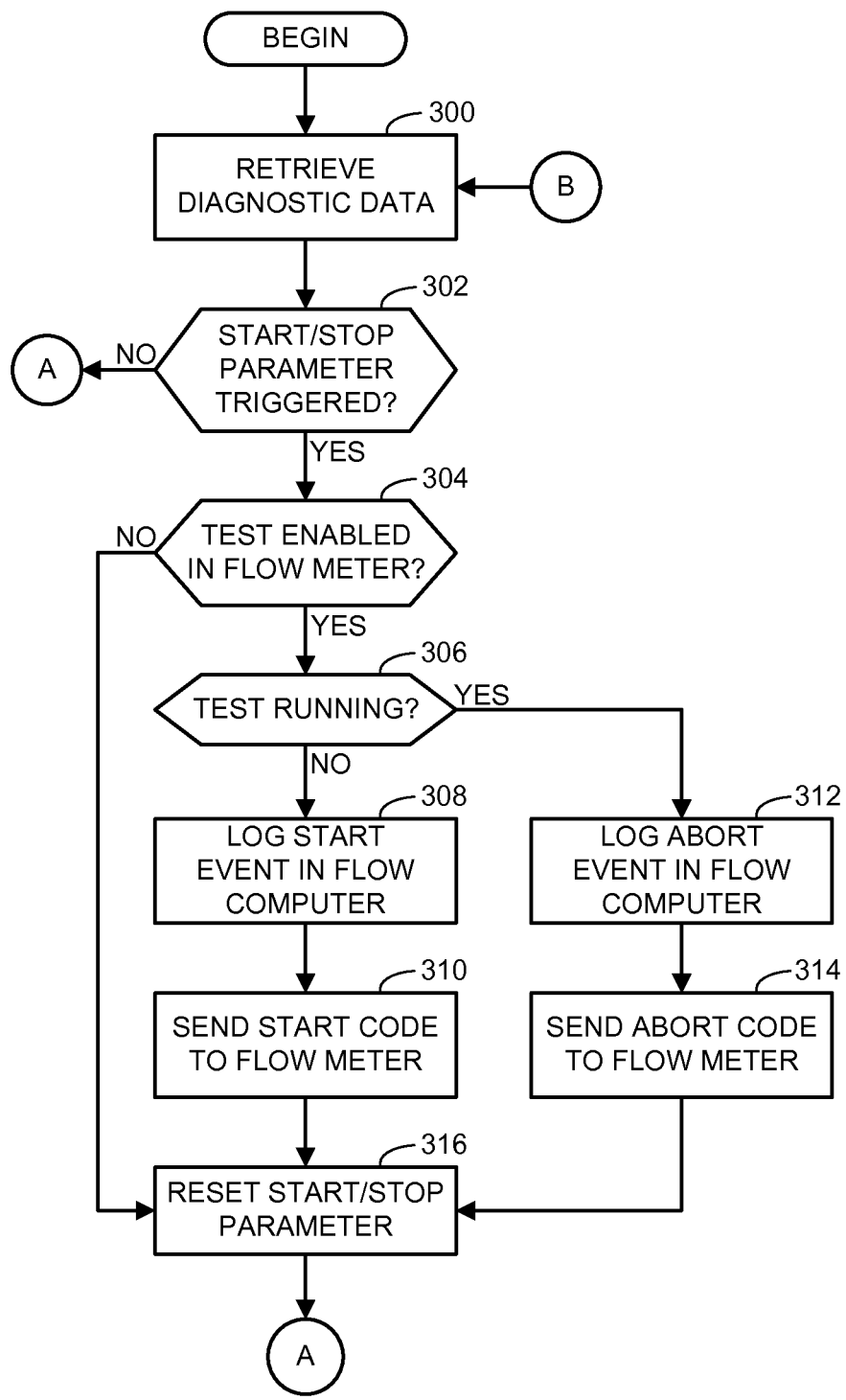
FIGS. 3A and 3B are respective first and second portions of a flowchart representative of another example process that may be carried out to implement the example flow computer and/or, more generally, the example system of FIG. 1.
Figure 3B:
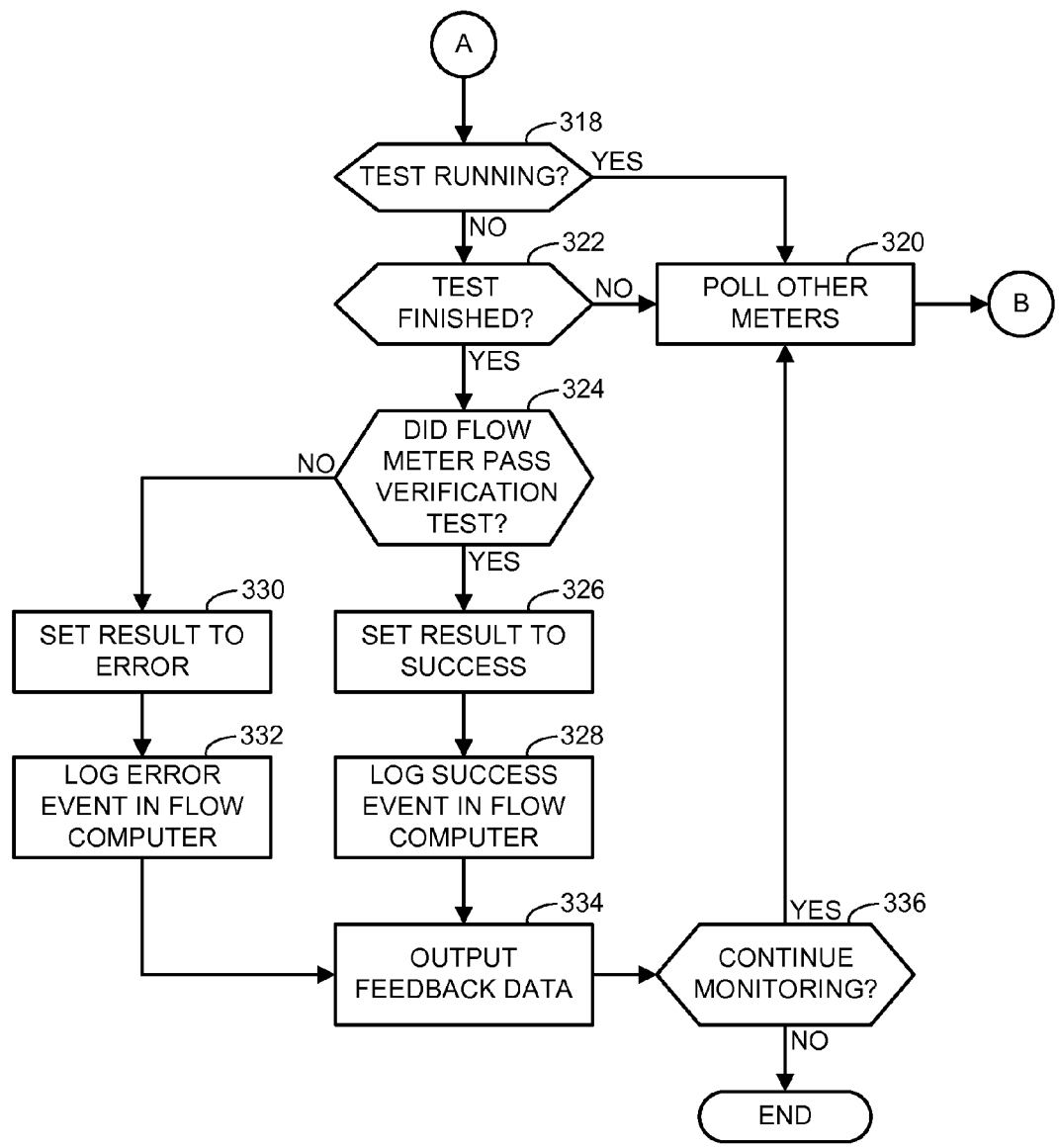

FIGS. 3A and 3B are respective first and second portions of a flowchart representative of an example process that may be carried out to implement the example flow computer 102, and/or, more generally, the example system 100 of FIG. 1. The example process begins in FIG. 3A by a flow computer (e.g., the example flow computer 102) retrieving diagnostic data (block 300) (for example, from a flow meter (e.g., 104) while implementing a diagnostic application (e.g., 112) associated with a verification test). The diagnostic data may include any relevant information such as the operational state of the verification test (e.g., running/not running), the progress and/or completion of the verification test (e.g., initializing, measuring, analyzing, complete, and/or percent complete), the value of secondary parameters measured and/or calculated during the verification test, the results of the verification test (e.g., success or failure of the flow meter (e.g., 104) in passing the verification test), and/or any errors associated with a failure of the flow meter 104. In the illustrated examples, the diagnostic data is stored in the memory of the flow meter (e.g., the memory 114 of the flow meter 104). In some examples, the diagnostic data may be stored in registers associated with the flow meter (e.g., 104) that the flow computer (e.g., 102) has access to by communicating with the flow meter (e.g., 104) via a corresponding interface (e.g., 124).

During the example process of FIGS. 3A and 3B, the process determines whether a start/stop parameter has been triggered (block 302). In the illustrated example, the start/stop parameter is a single parameter stored within the flow computer (e.g., 102) that is set by an operator to request the flow meter (e.g., 104) to either initiate (e.g., start) the verification test or abort (e.g., stop) a verification test currently underway. For example, the start/stop parameter may have a default value of 0 which, if triggered (e.g., set to 1), indicates the verification test is to either begin or abort. Whether the triggered parameter starts or stops the verification test is determined based on whether or not the test is already running as will be described in greater detail below. In some examples, the start/stop parameter is triggered by an operator via any of a SCADA host system (e.g., 106), an external device (e.g., 108), and/or an operator display (e.g., 126) of the flow computer (e.g., 102). In some examples, the start/stop parameter is triggered to run the verification test a single time. In other examples, the start/stop parameter is configured to periodically trigger the verification test based on a schedule defined by the operator. If the example process determines that the start/stop parameter has not been triggered, the example process advances to block 318 (FIG. 3B) where the example process determines whether the verification test is running, as will be described in greater detail below. If the example process determines that the start/stop parameter has been triggered (e.g., set to 1), the example process determines whether the verification test is enabled in the flow meter (e.g., 104) (block 304). For example, many known flow meters do not include the internal functionality (e.g., the diagnostic application(s) 112) to perform the verification test. In such examples, where it is determined that the verification test is not enabled, the example process advances to block 316 where the start/stop parameter is reset (e.g., set to 0) before continuing as described below.

If the verification test is enabled within the flow meter (e.g., the diagnostic application(s) 112 include the functionality to run the verification test), the example process includes determining whether the verification test is currently running or is currently inactive (block 306). For example, as mentioned previously, included within the diagnostic data retrieved from the flow meter (e.g., 104) at block 300 is an indication of the operational state of the verification test that indicates whether or not the test is running. If the example process determines that the verification test is not running, the example process logs a start event in the flow computer (e.g., in an audit trail and/or other archive within the mass storage device 128 of the flow computer 102) (block 308). In addition to logging a start event (block 308), the example process also includes generating and sending a start code to the flow meter (e.g., 104) (block 310). In this manner, the verification test is actually started by the flow meter (e.g., 104) as instructed by the code received via the flow computer (e.g., 102).

If the example process determines at block 306 that the verification test is running (after determining that the start/stop parameter has been triggered at block 302), the example process logs an abort event in the flow computer (e.g., 102) (block 312) and generates and sends an abort code to the flow meter (e.g., 104) (block 314). In other words, when the start/stop parameter is triggered (e.g., set to 1) while the verification test is already in progress, the example process determines that the currently running verification test is to be aborted, the example process creates the appropriate event log (e.g., in an audit trail) and then provides the code to instruct the flow meter (e.g., 104) to actually stop the verification test. After the appropriate event is logged (e.g., a start event at block 308 or an abort event at block 312) and the corresponding code is sent (e.g., the start code at block 310 or the abort code at block 314), the example process resets the start/stop parameter (e.g., set to 0) (block 316). In this manner, the start/stop parameter is configured to be triggered again to either start or stop the verification test depending upon the current operational state (e.g., running/not running) of the verification test.

The example process further includes determining whether the verification test is running (block 318) (FIG. 3B). This determination is made in the same manner as described above (at block 306) but accounts for any changes as a result of initiating (block 310) or aborting (block 314) the verification test. If it is determined that the verification test is running, meaning the verification test has just been initiated or is otherwise not finished, the example process polls data from other meters (e.g., the other flow meters 110) (block 320). After polling other meters (e.g., 110), the example process returns to block 300 (FIG. 3A) to retrieve any updated diagnostic data and repeat the process. In some examples, each iteration of the example process of FIGS. 3A and 3B, including polling the other meters (at block 320), is carried out once per second. In this manner, the example process is always using up-to-date or current diagnostic data retrieved during each pass of block 300. In some examples, the example process cycles through the process to retrieve diagnostic data (block 300) (FIG. 3A) approximately once every second regardless of whether an associated flow meter (e.g., 104) is running a verification test. In other examples, the example process cycles through once every four seconds. In this manner, even when the flow computer loses communication with a flow meter (e.g., 104) undergoing the verification test, if communications are restored before the verification test is complete, the flow computer will be able to recognize the operational state of the verification test and continue monitoring the flow meter (e.g., 104) until the verification test finishes or otherwise stops running. Other examples may cycle through the example process at different frequencies more or less than the examples outlined above.

If it is determined that the verification test is not running (at block 318), the example process determines whether the verification test was finished or completed (block 322). In addition to the diagnostic data indicating whether or not the verification test is running (e.g., based on an operational state parameter), the data retrieved from the flow meter (e.g., 104) may also include information indicating the progress and/or completion of the verification test. If it is determined that the verification test is not finished (e.g., if the verification test was initiated and then aborted before completion), the example process again advances to block 320 to poll other meters (e.g., 110). If, on the other hand, it is determined that the verification test is finished (e.g., the verification test stopped running (as determined at block 318) because the flow meter (e.g., 104) completed the verification test), the example process determines whether the flow meter (e.g., 104) passed the verification test (block 324). A flow meter (e.g., 104) that passes the verification test indicates the reliability of the performance and/or integrity of the flow meter (e.g., 104).

For example, as described above, the reliability of flow meters that use the Coriolis Effect may be determined by determining the stiffness factors or parameters of the tube(s) at various locations (e.g., at the inlet and at the outlet of the flow meter) and comparing such stiffness parameters with factory specification limits for the stiffness parameters via the verification test. Diagnostic tools for other types of flow meters may not base a verification test on stiffness parameters. However, such flow meters may still measure and/or calculate any other suitable metric to compare with factory specifications to similarly determine whether the flow meter passed or failed the verification test. Thus, in some examples, as the verification test is completed within the flow meter (e.g., 104), one of the outputs included within the diagnostic data retrieved at block 300 (FIG. 3A) of the example process indicates whether the flow meter at issue (e.g., the flow meter 104) passed or failed the verification test. If it is determined that the flow meter (e.g., 104) passed the verification test (at block 324), the example process sets a result (e.g., a result parameter within the flow computer (e.g., 102)) to a success value (block 326). The example process also logs a success event in the flow computer (e.g., 102) (block 328). In some examples, the success event is logged within an audit trail or other archive to be accessed and/or reviewed via other components (e.g., the SCADA host system 106) associated with the flow computer (e.g. 102).

If it is determined that the flow meter (e.g., 104) failed the verification test, the example process sets the result to an error value (block 330). The error value may be indicative of one or more reasons for the failure. For example, the error value for a flow meter that uses the Coriolis Effect may indicate whether one or more locations (e.g., inlet and/or outlet) on the flow meter tube(s) has a measured stiffness parameter outside the tolerance level or boundary limit defined by the manufacturer. In some examples, the error value may indicate by how much the measured stiffness parameters exceeded or fell below the preconfigured limits or thresholds. Furthermore, any other flow meter that can perform a verification test may provide an error value for a corresponding result parameter indicating similar problems relevant to the basis in which the flow meter was tested. Additionally, in other examples, for any type of flow meter, the error value may indicate that, although the verification test was complete, the data is not reliable.

In addition to setting the result to an error value, the example process also logs an error event in the flow computer (e.g., 102) (block 332). In some examples, the error event is logged within an audit trail or other archive to be accessed and/or reviewed via other components (e.g., the SCADA host system 106) associated with the flow computer (e.g. 102).

Additionally, the illustrated example process outputs feedback data associated with the verification test (block 334), which may include the result of the verification test. For example, the success or failure of the flow meter (e.g., 104) in passing the verification test may be displayed for an operator viewing a display associated with any of a SCADA host system (e.g., 106), an external device (e.g., 108), and/or an operator display (e.g., 126) of the flow computer (e.g., 102). In some examples, the feedback data includes additional information based on the verification test such as the progress and/or completion of the verification test and/or the value of secondary parameters associated with the verification test. Furthermore, in some examples, if the flow meter (e.g., 104) failed the verification test, the output feedback data may also include information pertaining to the point during the verification test where the flow meter (e.g., 104) failed (e.g., the progress of the test at the time of failure), the reasons for failure (e.g., based on the error value of the result), and/or an alarm to attract the attention of an operator.

The example process of FIGS. 3A and 3B further includes determining whether to continue monitoring the flow meter (e.g., 104) (block 336). If the example process is to continue monitoring the flow meter (e.g., 104), the example process returns to block 320 to poll other meters (e.g., 110) before again retrieving the latest diagnostic data (at block 300 (FIG. 3A)) to repeat the example process as described above. If the example process determines not to continue monitoring the flow meter (e.g., 104), the example process ends.

Figure 4A:
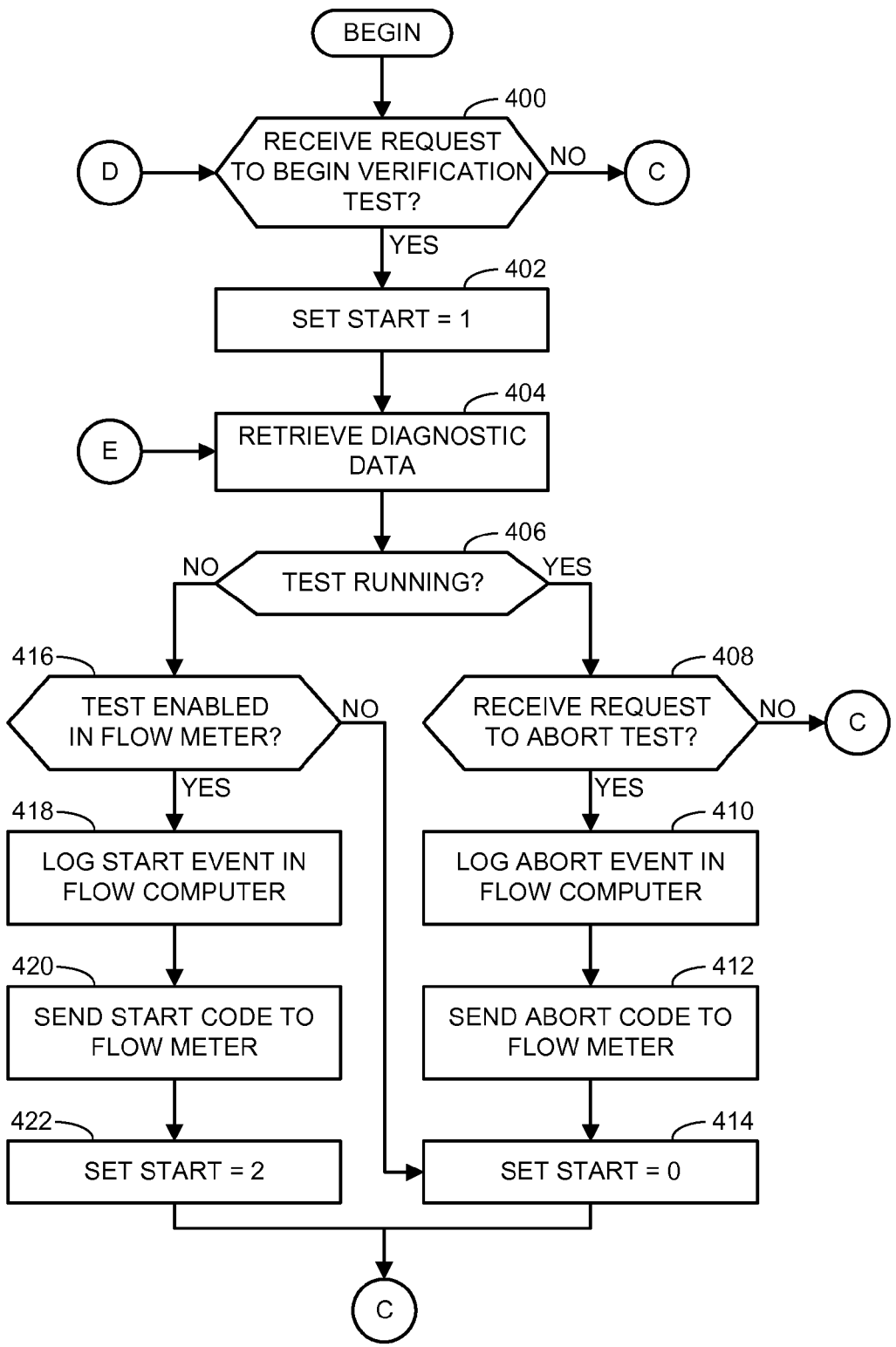
FIGS. 4A and 4B are respective first and second portions of a flowchart representative of another example process that may be carried out to implement the example flow computer and/or, more generally, the example system of FIG. 1.
Figure 4B:
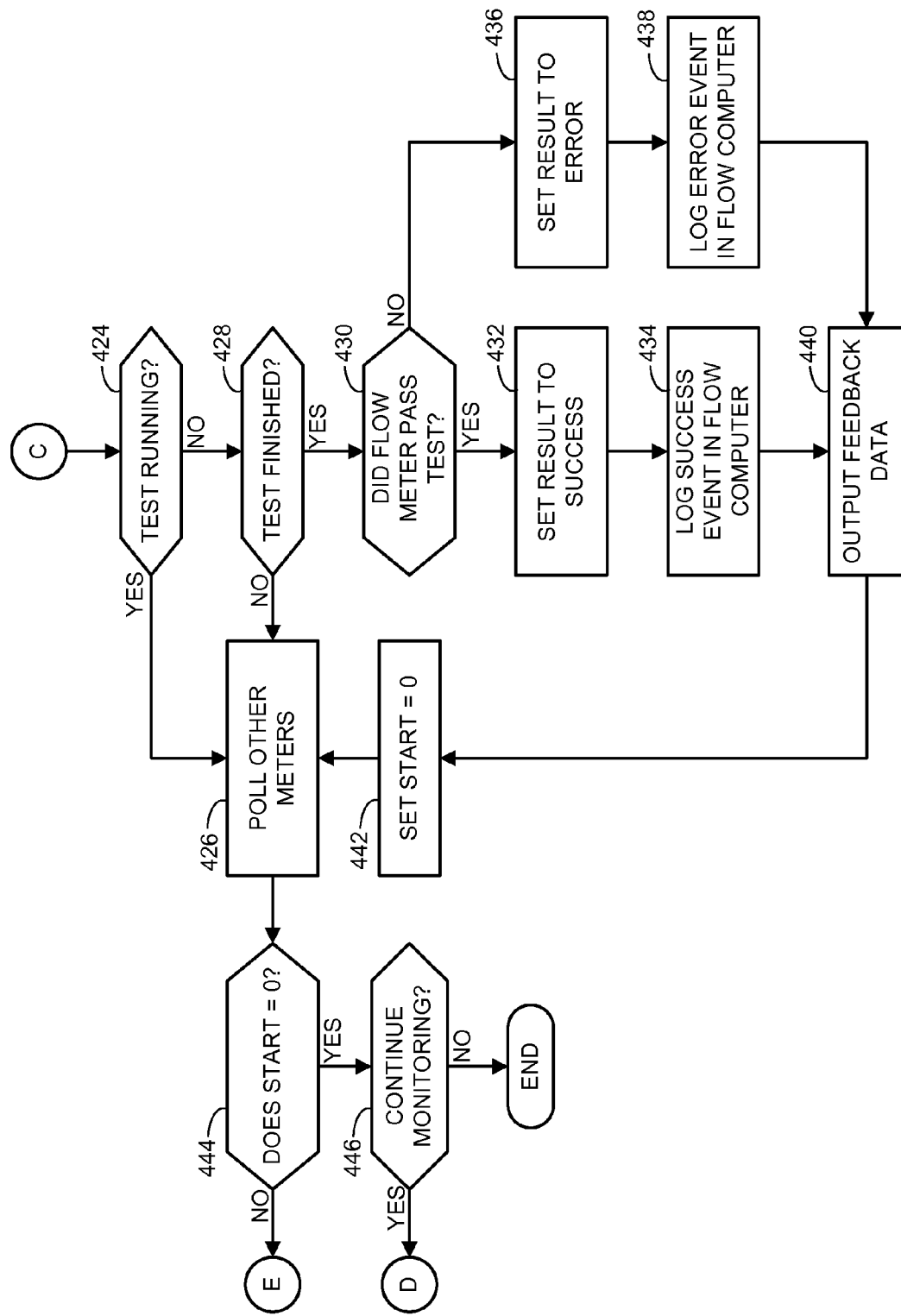

FIGS. 4A and 4B are respective first and second portions of a flowchart representative of another example process that may be carried out to implement the example flow computer 102, and/or, more generally, the example system 100 of FIG. 1. The example process begins in FIG. 4A by determining whether a request to initiate a verification test in a flow meter (e.g., 104) has been received (block 400). The request may be received from an operator either at that time or based on a schedule previously entered via, for example, any of a SCADA host system (e.g., 106), an external device (e.g., 108), and/or an operator display (e.g., 126) of the flow computer (e.g., 102). If no request has been received, the example process advances to block 424 (FIG. 4B) to determine whether a verification test is running within the flow meter (e.g., 104) in the same manner as determined at block 318 described above in connection with FIG. 3B. If a request to initiate a verification test was received (at block 400), the example process sets a start parameter to a value (e.g., start=1) indicating a request was received to initiate a verification test (block 402). The example process continues by retrieving diagnostic data (block 404). The diagnostic data is retrieved in the same manner and contains the same information as described above in connection with block 300 of FIG. 3B.

The example process includes determining whether the verification test is running (block 406) (based on, for example, the diagnostic data retrieved at block 404). If it is determined that the verification test is running, the example process determines whether a request to abort the verification test has been received (block 408). If a request to abort the verification test is received, the example process logs an abort event (block 410) and writes an abort code instructing the flow meter (e.g., 104) to abort the verification test (block 412). The example process then sets the start parameter to a value indicating the verification test is no longer to be completed (e.g., start=0) (block 414). At this point the example process advances to block 424 (FIG. 4B) to proceed in the same manner as described above at block 318 of FIG. 3B. In contrast, if it is determined that a request to abort the verification test was not received, the example process advances directly to block 424.

If the example process determines (at block 406) that the verification test is not running, the example process determines whether the verification test is enabled within the flow meter (e.g., 104) (block 416). If the verification test is not enabled, the example process advances to block 414, where the start parameter is set to a value indicating the verification test is no longer to proceed (e.g., start=0). If the verification test is enabled in the flow meter (e.g., 104), the example process logs a start event (block 418) and sends a start code to the flow meter (e.g., 104) instructing the flow meter (e.g., 104) to begin the verification test (block 420). The example process then sets the start parameter to a value indicating instructions were sent to the flow meter (e.g., 104) to begin the verification test (e.g., start=2) (block 422). The example process then advances to block 424 to determine whether the verification test is running in the same manner as described above for block 318 of FIG. 3B.

Blocks 424, 426, 428, 430, 432, 434, 436, 438 and 440 of the example process in FIGS. 4A and 4B are implemented in a similar manner to those described above as blocks 318, 320, 322, 324, 326, 328, 330, 332, and 334 of FIGS. 3A and 3B, respectively. However, after outputting the results of the verification test (at block 440), the example process of FIGS. 4A and 4B sets the start parameter to a value indicating the verification test is completed and/or no longer needs to be completed (e.g., start=0) (block 442). After doing so, the example process then returns to block 426 to poll other meters before determining whether the start parameter indicates the verification test no longer needs to be completed (e.g., start=0) (block 444). If the verification does need to continue (e.g., start>0), the example process returns to block 404 (FIG. 4A) to retrieve updated diagnostic data before repeating the rest of the example process. If the start parameter indicates the verification test no longer needs to be completed (at block 444), the example process determines whether to continue monitoring the flow meter (e.g., 104) (block 446). If the flow meter (e.g., 104) is to continue being monitored, the example process returns to block 400 (FIG. A) to continue through the entire example process of FIGS. 4A and 4B. If it is determined not to continue monitoring, the example process ends.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
communicating, via a flow computer, a request to a flow meter to initiate a verification test of the flow meter, the verification test being performed while fluid flows through the flow meter;
retrieving, via the flow computer, diagnostic data from the flow meter; and
logging a report of the verification test in a log of the flow computer, the report including a result and a timestamp of the verification test based on the diagnostic data.

2. The method of claim 1, further comprising logging a start event in the log corresponding to the request to initiate the verification test.

3. The method of claim 1, further comprising:
receiving a request to abort the verification test; and
logging an abort event corresponding to the request to abort the verification test.

4. The method of claim 1, wherein the diagnostic data comprises an indication of at least one of an operational state of the verification test, a value of a secondary parameter associated with the flow meter, a progress of the verification test, or a completion of the verification test.

5. The method of claim 4, wherein the result is based on a comparison of the value of the secondary parameter and a boundary limit associated with the secondary parameter, the value of the secondary parameter determined based on the verification test, the boundary limit defined by a factory specification.

6. The method of claim 1, further comprising outputting feedback data associated with the verification test via at least one of a supervisory control and data acquisition host system associated with the flow meter, an operator display of the flow computer, or an external device, the feedback data comprising the result of the verification test.

7. The method of claim 6, wherein, if the result corresponds to a failure of the flow meter to pass the verification test, the feedback data comprises at least one of an alarm associated with the failure, a progress of the verification test corresponding to when the failure was determined, or a reason for the failure.

8. The method of claim 1, wherein the result corresponds to one of a success event or a failure event, the success event corresponding to the flow meter passing the verification test, the failure event corresponding to the flow meter failing the verification test.

9. The method of claim 1, wherein the log corresponds to at least one of an event log, an alarm log, or an audit trail.

10. The method of claim 1, wherein the flow meter is a coriolis flow meter.

11. The method of claim 1, wherein the request to initiate the verification test is triggered based on a schedule defined by an operator.

12. A flow computer comprising:
a flow meter interface to communicatively couple the flow computer to a flow meter, the flow meter interface to communicate a request to the flow meter to initiate a verification test of the flow meter and to retrieve diagnostic data from the flow meter, the verification test to be performed while fluid flows through the flow meter; and
a memory to log a report of the verification test, the report including a timestamp and a result of the verification test based on the diagnostic data.

13. The flow computer of claim 12, wherein the memory is to log a start event in the log corresponding to the request to initiate the verification test.

14. The flow computer of claim 12, wherein the flow meter interface is to receive a request to abort the verification test, the memory is to log an abort event corresponding to the request to abort the verification test.

15. The flow computer of claim 12, further comprising an external interface to communicatively couple the flow computer to at least one of a supervisory control and data acquisition host system associated with the flow meter, an operator display of the flow computer, or an external device, the external interface to output the result of the verification test.

16. The flow computer of claim 15, wherein, if the result corresponds to a failure of the flow meter to pass the verification test, the external interface is to output at least one of an alarm associated with the failure, a progress of the verification test corresponding to when the failure was determined, or a reason for the failure.

17. A tangible machine readable storage medium comprising instructions, which when executed, cause a machine to at least:
  communicate a request to a flow meter to initiate a verification test of a flow meter, the verification test to be performed while fluid flows through the flow meter;
  retrieve diagnostic data from the flow meter; and
  log a report of the verification test in a log of the flow computer, the report including a result and a timestamp of the verification test based on the diagnostic data.

18. The storage medium of claim 17, wherein the instructions, when executed, further cause the machine to log a start event in the log corresponding to the request to initiate the verification test.

19. The storage medium of claim 17, wherein the instructions, when executed, further cause the machine to
  receive a request to abort the verification test; and
  log an abort event corresponding to the request to abort the verification test.

20. The storage medium of claim 17, wherein the instructions, when executed, further cause the machine to output feedback data associated with the verification test via at least one of a supervisory control and data acquisition host system associated with the flow meter, an operator display of the flow computer, or an external device, the feedback data comprising the result of the verification test.

21. The storage medium of claim 18, wherein, if the result corresponds to a failure of the flow meter to pass the verification test, the feedback data comprises at least one of an alarm associated with the failure, a progress of the verification test corresponding to when the failure was determined, or a reason for the failure.

* * * * *